United States Patent Office 3,034,252
Patented May 15, 1962

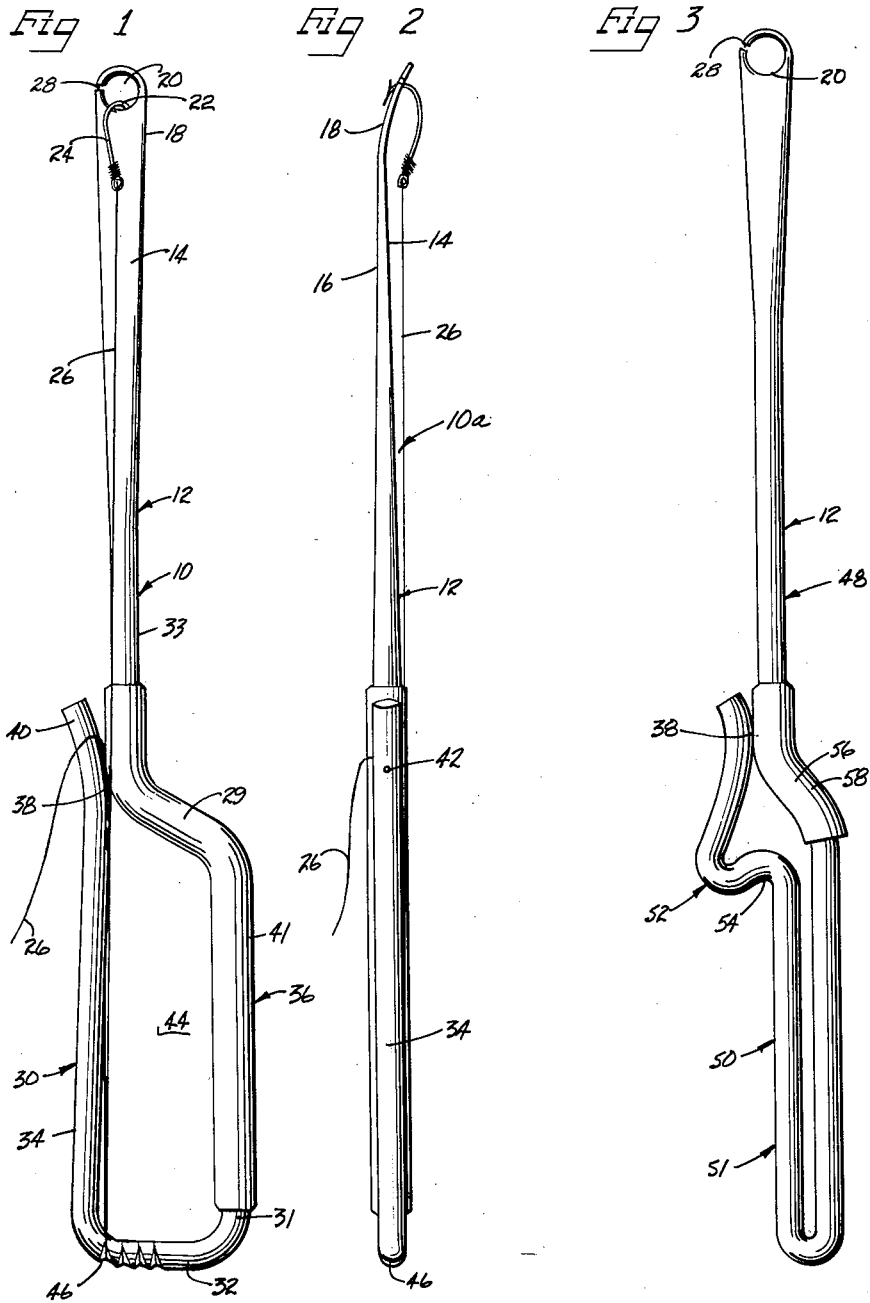

3,034,252
FISH HOOK EXTRACTOR
Ben Joseph Basinski, 1422 W. 105th St., Chicago, Ill.
Filed Aug. 12, 1958, Ser. No. 754,578
2 Claims. (Cl. 43—53.5)

This invention relates to a fish hook extractor, and more particularly to a tool for disengaging an embedded fish hook from the body or mouth of a fish, having means for retaining the hook securely and for affording easy manipulation during the extraction process.

Heretofore, various extractors of the type indicated have been available, but these have generally been unwieldly in use and have not afforded adequate means for preventing disengagement of the hook from the tool; particularly in that the line to which the hook is secured has leveled to permit movement of the hook. The device of the invention overcomes this difficulty by providing a shaft made from aluminum, stainless steel or other preferably corrosion-resistant and slightly resilient material, one end of the shaft being slightly offset relative to the longitudinal axis thereof and defining an opening therethrough and a slot extending from a side edge of the offset portion into the opening. The slot has a width which permits a fishline of the type used with a hook for which the tool is designed to be employed to pass freely therethrough. Thus when the upper surface of the offset portion is disposed away from the fish hook and the line inserted into the slot, movement of the tool toward the hook will place the shank of the hook in overlying relationship to the upper surface of the offset portion with the pointed end thereof disposed beneath the offset portion in a relatively protected position.

The other end of the tool shaft has an integrally formed and reversely turned extension which cooperates with the shaft in providing a handle structure which may be firmly grasped to promote ease in manipulating the tool. An end portion of the extension is biased into contact with the shaft to define a catch which is adapted to releasably engage the line to which the hook is secured between the extension and the shaft. A sleeve of a relatively high friction characteristic, such as a sleeve made of rubber or the like, is disposed on the shaft in position to assist in holding the line taut and in retaining the hook on the tool.

In one embodiment of the invention the extension includes a section extending transversely from the end of the shaft and defining a plurality of serrations adapted to receive the fish line therein and to cooperate with the catch in providing a loop forming means so that the operator does not have to secure the line manually during use of the tool.

In another embodiment of the invention, the extension is disposed in substantially parallel proximate relationship to the shaft and defines a sinuous construction adjacent the catch which forms a recess which is similarly adapted to receive the line and to cooperate with the catch in providing a loop forming means for the line.

In yet another form of the invention, the extension carries a pin which is slidably received in the shaft substantially at the point of contact between the extension and shaft, preferably in perpendicular relationship to the longitudinal axis of the shaft. The pin thus prevents the line from slipping into the opening defined by the handle and also retains the extension in proper alignment with the shaft to assure firm engagement of the line.

Accordingly, it is an object of the present invention to provide a fish hook extractor which is adapted to retain a fish hook in a position where it will not catch during withdrawal from the fish as well as means for maintaining the hook in the desired position on the tool which include a resilient catch structure for releasably engaging a fish line.

Another object of the invention is to provide a device as described wherein the catch means is provided by an extension of the extractor shaft, the extension also providing a handle which is readily grasped and which permits easy manipulation of the tool.

Another object of the invention is to provide a tool as described wherein means are formed on the handle structure which are adapted to cooperate with the catch means in defining a loop receiving construction for the fish line so that there is no need to hold the line manually.

Another object of the invention is to provide an extractor as described which defines a structure at the end opposite the handle for receiving the hook therein without the need for twisting or pushing the line.

Other objects and advantages of the invention will become apparent as the description proceeds in accordance with the drawings, in which:

FIGURE 1 is a plan view of the extractor of the invention;

FIGURE 2 is a side elevation of another form of the extractor of the invention; and FIGURE 3 is a plan view of another embodiment of the invention.

Referring now to FIGURE 1, a tool 10 is shown, which corresponds generally to the embodiment 10a of FIGURE 2 and is adapted for use in extracting a fish hook from the gullet or other area of a fish or the like. The tool 10 includes a shaft 12 which is preferably of a corrosion-resistant material such as stainless steel or aluminum, and which has upper and lower surfaces 14 and 16 tapering gradually toward one end thereof and defining a flattened end portion 18 which is offset relative to the longitudinal axis of the shaft and which defines an opening 20 adapted to retain a fish hook 22 therein with the shank 24 of the hook disposed in overlying relationship to the upper surface 14 of the shaft. The end portion 18 also defines a slot 28 which extends from a side edge of the end portion into the opening 20 and which has a width sufficient to freely admit a fish line or leader 26 of the usual type. The shaft 12 is turned outwardly at 29 so that the end portion 31 thereof is spaced laterally from the major length 33 thereof and in preferably parallel relation thereto, and an extension 30 is integrally formed therewith which includes a transversely extending section 32 and a reversely extending portion 34 which cooperates with the shaft 12 in providing a handle 36 for the tool. The reversely extending portion 34 is biased into contact with the shaft 12 at 38, and has its end portion 40 turned outwardly to define with the shaft a substantially V-shaped catch means opening in the direction of the offset end 18. In order to assist in maintaining the line 26 in the catch means, as hereinafter further described, a sleeve 41 is disposed on the shaft 12, and desirably extends along the end 33 of the shaft to provide a handle grip. The sleeve 41 may be made of rubber or other material having a relatively high friction characteristic so that the line will not slip from the catch by accident once it has been inserted.

Referring now to FIGURE 2, the embodiment 10a of the invention corresponds to the embodiment of FIGURE 1 but includes a pin 42 carried by the extension 30 substantially at the contact point 38. The pin 42 is slidably received in the shaft 12 and in the sleeve 41, by means of a suitable bore (not shown), preferably in substantially perpendicular relationship to the longitudinal axis of the shaft. The pin thus effectively maintains the extension 30 in proper alignment with the shaft 12 and also acts as a stop to prevent accidental movement of the line into the area 44 defined by the handle.

In both the embodiment of FIGURE 1 and the embodiment of FIGURE 2, the transversely extending section 32 defines a plurality of serrations 46 which are adapted to alternately receive the line therein and to prevent fumbling by cooperating with the catch in affording loop forming means for the line, as shown.

Referring now to FIGURE 3, another embodiment of the invention is shown, generally designated by reference numeral 48, and wherein similar parts are referred to by similar reference numerals. In this embodiment a reversely turned extension 50 is disposed in proximate substantially parallel relationship to the shaft 12 to provide a handle 51 therewith. The extension 50 defines a sinuous construction 52 above the handle 51 which includes a recess 54 adapted to receive the line 26 so as to cooperate with the catch at the contact area 38 in affording a loop forming means for the line.

The shaft 12 is offset slightly at 56 and carries a sleeve 58 of a relatively high friction characteristic which similarly assists in securing the line in the catch, the sleeve being relatively short in the example shown. It will be appreciated that in this embodiment the line is kept out of contact with the operator's hand as the hand grips the handle 51.

In use, the extractor of the invention may be positioned substantially in parallel alignment with the line 26 and the line is disposed in the opening 20 by passing it through the slot 28. The tool may thereupon be moved forwardly until the shank 24 of the fish hook 22 passes through the opening 20 and the hook is positioned as shown in FIGURES 1 and 2. The line is then wound around the above described loop forming means provided by the serrations 46 or the recess 54 and the catch means of the invention and the frictional engagement between the resilient extension and the rubber sleeve will serve to retain the line against accidental disengagement as the tool is first moved axially forward to dislodge the hook and then withdrawn.

There has thus been provided a tool for use in disgorging fish hooks which is simple in construction and economical to manufacture, as well as durable and efficient in use. The tool eliminates the need for complicated manipulation in engaging the hook and also permits retention of the line without manual assistance so that the entire attention of the operator may be devoted to the extraction process.

I claim as my invention:

1. A fish hook extractor comprising a shaft having an offset, substantially flattened portion at one end thereof defining an opening therethrough and a slot of sufficient width to freely admit a fish line extending from a side edge of said flattened end portion into said opening, said flattened portion extending upwardly from a plane including the longitudinal axis of said shaft a sleeve on said shaft of a relatively high friction characteristic, an extension on the other end of said shaft cooperating therewith to provide a handle and having a portion thereof held firmly in abutting engagement with said sleeve with the end thereof offset relative to the axis of the shaft to define a V-shaped catch opening toward said one end, and a recessed structure on said extension spaced longitudinally from said catch and adapted to cooperate with said catch to permit a fish line to be wound longitudinally around said catch and said recessed portion to assist in securing a fish hook in said opening.

2. A fish hook extractor comprising a shaft having an offset, substantially flattened portion at one end thereof defining an opening therethrough and a slot of sufficient width to freely admit a fish line extending from a side edge of said flattened portion into said opening, said flattened portion extending upwardly from a plane including the longitudinal axis of the shaft, an extension on the other end of said shaft cooperating therewith to provide a handle and having an end thereof offset relative to the axis of the shaft to define with the shaft a V-shaped catch opening toward said one end of said shaft, means for grippingly engaging a line inserted in said V-shaped catch, and a recess formed on said extension spaced longitudinally from said catch and adapted to cooperate with said catch to permit a fish line to be wound longitudinally around said catch and said recess to assist in securing a fish hook in said opening.

References Cited in the file of this patent

UNITED STATES PATENTS

| | | |
|---|---|---|
| 498,481 | Musser | May 30, 1893 |
| 849,310 | Allshouse | Apr. 2, 1907 |
| 878,394 | Holle | Feb. 4, 1908 |
| 1,411,850 | Kroona | Apr. 4, 1922 |
| 2,176,330 | Beuckelaere | Oct. 17, 1939 |
| 2,441,458 | Underwood | May 11, 1948 |
| 2,550,791 | English | May 1, 1951 |
| 2,586,431 | Krichbaum | Feb. 19, 1952 |
| 2,793,463 | Nieman | May 28, 1957 |

FOREIGN PATENTS

| | | |
|---|---|---|
| 648,335 | France | Feb. 7, 1928 |